(12) United States Patent
Böhm (10) Patent No.: US 8,341,852 B2
(45) Date of Patent: Jan. 1, 2013

(54) ARRANGEMENT AND METHOD FOR GENERATING A REFERENCE IMPULSE FOR A POSITION MEASURING DEVICE

(75) Inventor: Gerd Böhm, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 100 days.

(21) Appl. No.: 13/120,550

(22) PCT Filed: Jul. 21, 2009

(86) PCT No.: PCT/EP2009/059363
§ 371 (c)(1),
(2), (4) Date: Mar. 23, 2011

(87) PCT Pub. No.: WO2010/034537
PCT Pub. Date: Apr. 1, 2010

(65) Prior Publication Data
US 2011/0209351 A1 Sep. 1, 2011

(30) Foreign Application Priority Data
Sep. 26, 2008 (DE) .......................... 10 2008 049 140

(51) Int. Cl.
*G01D 5/00* (2006.01)
(52) U.S. Cl. ......................................................... 33/706
(58) Field of Classification Search ................ 33/706, 33/707, 1 PT
See application file for complete search history.

(56) References Cited

U.S. PATENT DOCUMENTS

| | | | |
|---|---|---|---|
| 4,660,288 A * | 4/1987 | Dangschat ..................... 33/707 |
| 4,688,019 A * | 8/1987 | Schmitt ........................... 341/1 |
| 4,700,062 A * | 10/1987 | Ernst ......................... 250/231.18 |
| 4,793,067 A * | 12/1988 | Reimar et al. ................... 33/707 |
| 5,233,355 A | 8/1993 | Di Stefano et al. |
| 5,493,219 A | 2/1996 | Makino et al. |
| 5,869,962 A | 2/1999 | Kasumi et al. |
| 6,407,379 B1 | 6/2002 | Shinbo |
| 6,683,543 B1 | 1/2004 | Yeo |
| 7,142,973 B2 | 11/2006 | Ando |
| 7,856,334 B2 * | 12/2010 | Parker ............................ 33/293 |
| 2005/0278109 A1 | 12/2005 | Ando |
| 2011/0209351 A1 * | 9/2011 | Bohm ............................. 33/706 |

FOREIGN PATENT DOCUMENTS

DE 196 14 165 A1 10/1996

(Continued)

*Primary Examiner* — Yaritza Guadalupe-McCall
(74) *Attorney, Agent, or Firm* — Brinks Hofer Gilson & Lione (57) ABSTRACT

An arrangement for generating a reference impulse for a position measuring device, wherein the position measuring device includes a scale with at least one incremental track and at least one reference mark and a scanning unit for generating position signals by scanning the at least one incremental track and for generating an analog reference impulse by scanning the at least one reference mark. The arrangement includes a reference impulse memory unit that receives the analog reference impulse and stores the received analog reference impulse as a stored reference impulse. The arrangement further includes a reference impulse generating unit in communication with the reference impulse memory unit. The reference impulse generating unit receives the stored reference impulse and at least one of the position signals, wherein the reference impulse generating unit turns on a reference impulse as a function of the stored reference impulse and an occurrence of a set condition and turns off the reference impulse if a reset condition occurs, and the set and reset conditions are derivable from the at least one of the position signals.

15 Claims, 7 Drawing Sheets

FOREIGN PATENT DOCUMENTS

| | | |
|---|---|---|
| DE | 10 2004 002 722 A1 | 10/2004 |
| EP | 0 449 037 A1 | 10/1991 |
| EP | 0 621 460 A1 | 10/1994 |
| EP | 1 035 404 A1 | 9/2000 |

\* cited by examiner

ARRANGEMENT AND METHOD FOR GENERATING A REFERENCE IMPULSE FOR A POSITION MEASURING DEVICE

Applicant claims, under 35 U.S.C. §§120 and 365, the benefit of priority of the filing date of Jul. 21, 2009 of a Patent Cooperation Treaty patent application, copy attached, Serial Number PCT/EP2009/059363, filed on the aforementioned date, the entire contents of which are incorporated herein by reference, wherein Patent Cooperation Treaty patent application Serial Number PCT/EP2009/059363 was not published under PCT Article 21(2) in English.

Applicant claims, under 35 U.S.C. §119, the benefit of priority of the filing date of Sep. 26, 2008 of a German patent application, copy attached, Serial Number 10 2008 049 140.3, filed on the aforementioned date, the entire contents of which is incorporated herein by reference.

BACKGROUND OF THE INVENTION

1. Field of the Invention

The present invention relates to an arrangement and to a method for generating a reference impulse. The present invention also relates to a position measuring device having a corresponding arrangement for generating a reference impulse. A reference impulse is needed in incremental position measuring devices for defining a reference point for the position measurement.

2. Description of the Related Art

Incremental position measuring devices are known from many published references. They serve above all to determine relative displacements or the absolute position of machine parts, for instance in machine tools or measuring machines.

Such position measuring devices essentially include a scale graduation, on which one or more division tracks are applied, and a scanning unit, which scans the division tracks and converts changes in distance or angle into electrical signals. In length measuring instruments, the scale graduation is embodied for instance as a scale. If a length measuring instrument is used for measuring relative machine movements, the scale can be mounted in stationary fashion on the machine, while the scanning unit is secured to a movable part of the machine, such as a tool carriage, whose relative motion is to be measured relative to the machine. When the tool carriage is moved, the scanning unit moves in a scanning plane in the measurement direction parallel to the division tracks disposed on the scale so as to scan the division tracks, wherein such division tracks are located in a scale plane, and scans the division tracks. In the process, position signals are generated, which indicate the relative change in position of the scanning unit relative to the scale.

In incremental position measuring devices, the division tracks include code elements disposed uniformly one after the other in the measuring direction. Such division tracks are also called incremental tracks. From scanning one incremental track, usually either two position signals phase-offset from one another by 90°, or four position signals having have the phase relationships 0°, 90°, 180°, and 270°, are obtained. In addition, position measuring devices are also known which generate three position signals having the phase relationships 0°, 120° and 240°. Given a uniform motion of the scanning unit relative to the scale graduation, these position signals are largely sinusoidal. The position determination is effected by counting elapsed signal periods. Ascertaining an absolute position from the measurement of relative positions requires the creation of a reference point. This purpose is served by at least one so-called reference mark, which is disposed for instance on a reference track next to the incremental division track and which is likewise read off by the scanning unit. When the reference mark is scanned, an analog current or voltage pulse is created, from which in further processing a rectangular digital signal, a so-called reference impulse, is generated.

In the final analysis, the reference impulse is used in a downstream electronic unit for determining the reference position that is used as a reference point for the position measurement. The processing of the analog current or voltage pulse to make the reference impulse can be done for instance by a comparator, in which the analog input signal is compared with a defined switching threshold, and the output of which is switched accordingly.

The central demands made of the reference impulse are that the reference impulse has a defined location and width related to the position signals. If these demands are not met mistakes in ascertaining the reference point can occur in the downstream electronic unit in the logical linkage of the reference impulse with the position signals. For example, if the reference impulse is too narrow, it can happen that the reference impulse will fail to be detected; if it is too wide, the reference impulse may under some circumstances be detected at two different points. It is also especially problematic that in both cases, the location of the reference impulse relative to the position signals can be decisive as to whether the reference impulse is correctly detected, or not. Thus, in limited situations, even a slight change in the location of the reference impulse, for instance caused by temperature fluctuations, can be decisive as to the correct detection of the reference impulse. Both a missing reference impulse and a reference impulse detected twice, however, lead to an error situation that can mean failure of the machine on which the position measuring device is operated.

Until now, the location of the reference impulse has predominantly been adjusted by complicated mechanical calibration of the scanning unit once the position measuring device has been mounted on the target application, such as a machine tool or a wafer scanning unit. In some scanning principles, the analog reference impulse can be shifted relative to the incremental division track as a result of rotation of the scanning unit. The width of the reference impulse can be adjusted by varying the comparator threshold, that is, the switching threshold that the analog current or voltage pulse must exceed or undershoot in order to generate the turn-on or turn-off edge of the reference impulse. Alternatively, a positive or negative offset can also be superimposed on the analog reference impulse. The higher the resolution of the position measuring device, the greater the expense and complexity of this mechanical and electrical calibration. This method is of virtually no use with division periods in the range of a few micrometers. A further factor is that at these resolutions, thermal expansions, the effects of contamination, and so forth can generate effects that attain orders of magnitude, which affect the location and width of the digital reference impulse to a critical extent, even if exact mechanical calibration of the scanning unit is done.

SUMMARY AND OBJECTS OF THE INVENTION

It is therefore an object of the present invention to disclose an arrangement for generating a reference impulse with a defined location and width, relative to the position signals of the incremental track.

This object is attained by an arrangement for generating a reference impulse for a position measuring device, wherein the position measuring device includes a scale with at least one incremental track and at least one reference mark and a scanning unit for generating position signals by scanning the at least one incremental track and for generating an analog reference impulse by scanning the at least one reference mark. The arrangement includes a reference impulse memory unit that receives the analog reference impulse and stores the received analog reference impulse as a stored reference impulse. The arrangement further includes a reference impulse generating unit in communication with the reference impulse memory unit. The reference impulse generating unit receives the stored reference impulse and at least one of the position signals, wherein the reference impulse generating unit turns on a reference impulse as a function of the stored reference impulse and an occurrence of a set condition and turns off the reference impulse if a reset condition occurs, and the set and reset conditions are derivable from the at least one of the position signals.

An arrangement for generating a reference impulse for a position measuring device is now proposed, which device includes a scale with at least one incremental track and at least one reference mark. The device also includes a scanning unit for generating position signals by scanning the at least one incremental track and for generating an analog reference impulse by scanning the at least one reference mark. In the arrangement, the analog reference impulse can be stored as a stored reference impulse in a reference impulse memory unit, and the stored reference impulse and at least one position signal are delivered to a reference impulse generating unit. The reference impulse generating unit turns on a reference impulse as a function of the stored reference impulse and the occurrence of a set condition and turns the reference impulse off if a reset condition occurs. The set and reset conditions can be derived from the at least one position signal.

It is also an object of the present invention to implement a method for generating a reference impulse with a defined location and width relative to the position signals of the incremental track.

This object is attained by a method for generating a reference impulse for a position measuring device, wherein the position measuring device includes a scale with at least one incremental track and at least one reference mark. The position measuring device also includes a scanning unit for generating position signals by scanning the at least one incremental track and for generating an analog reference impulse by scanning the at least one reference mark. The method includes storing the analog reference impulse in a reference impulse memory unit as a stored reference impulse and outputting the stored reference impulse to a reference impulse generating unit. The method including turning on a reference impulse in a reference impulse generating unit as a function of the stored reference impulse and of an occurrence of a set condition, which is derivable from at least one of the position signals. The method further including turning off the reference impulse in the reference impulse generating unit after an occurrence of a reset condition, which is derivable from the at least one of the position signals.

To that end, a method for generating a reference impulse for a position measuring device is proposed, which device includes a scale with at least one incremental track and at least one reference mark and also includes a scanning unit for generating position signals by scanning the at least one incremental track and for generating an analog reference impulse by scanning the at least one reference mark, the method including:

storing the analog reference impulse in the reference impulse memory unit and outputting the stored reference impulse to the reference impulse generating unit;

turning on the reference impulse in the reference impulse generating unit as a function of the stored reference impulse and of the occurrence of a set condition, which can be derived from at least one position signal; and turning off the reference impulse in the reference impulse generating unit after the occurrence of a reset condition, which can be derived from at least one position signal.

Further advantages and details of the present invention will become apparent from the ensuing description in conjunction with the drawings.

DESCRIPTION OF THE PREFERRED EMBODIMENT(S) OF THE INVENTION

Figure 1:
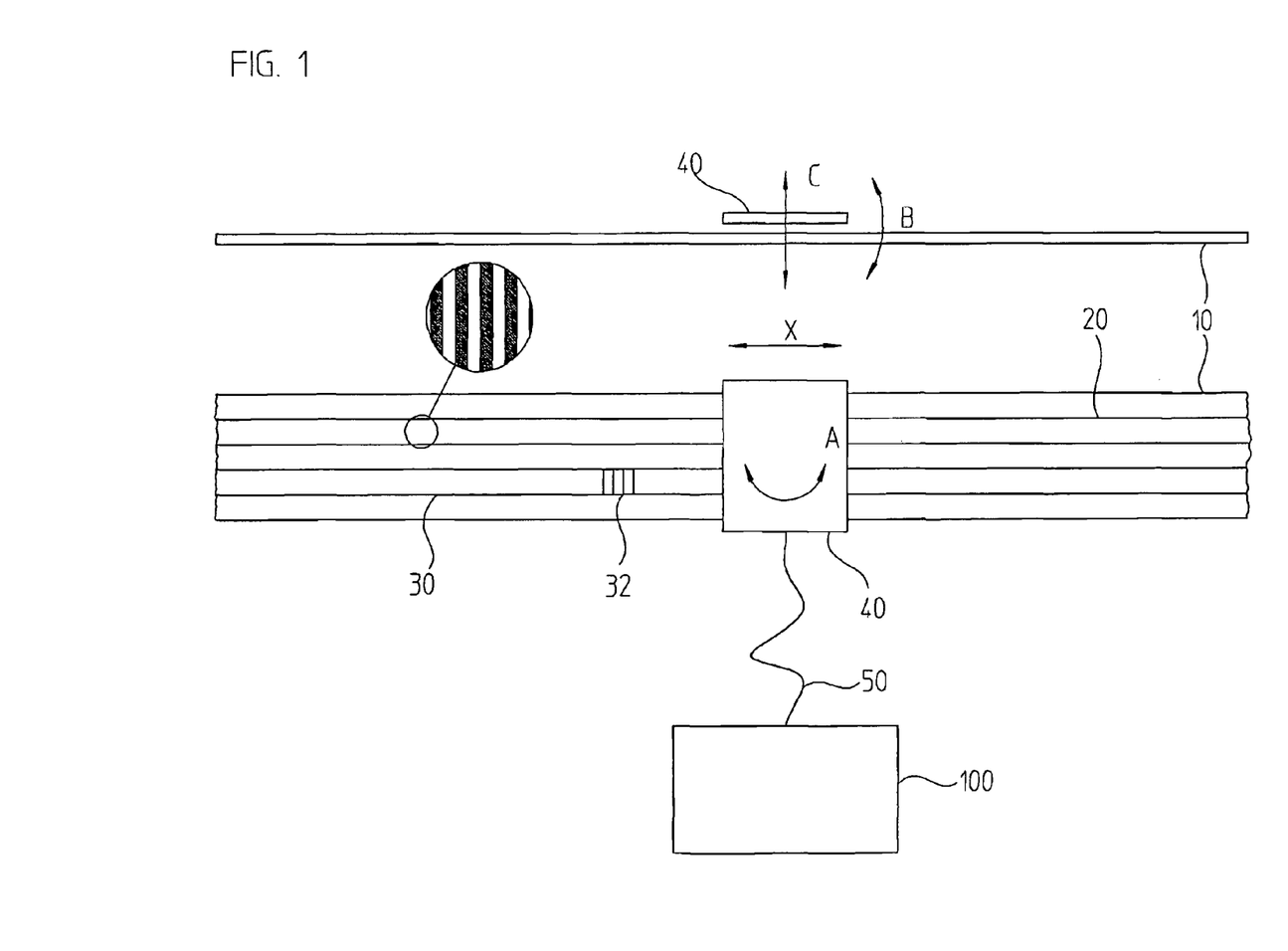
FIG. 1 is a highly simplified illustration of an embodiment of a length measuring instrument in accordance with the present invention in two three-dimensional views.

FIG. 1 shows a highly simplified illustration of a length measuring instrument in two three-dimensional views (a top view and a side view). The length measuring instrument includes a scale graduation, in the form of a scale 10 with an incremental track 20 and a reference track 30, and a scanning unit 40. The scanning unit 40 is connected via signal lines 50 to a downstream electronic unit 100. The downstream electronic unit 100 may for instance be a pulse forming electronic unit, which is disposed spatially close to the scanning unit 40, or directly in the scanning unit 40, and which processes the various scanning signals and carries them on to a machine controller (MC) (not shown). Alternatively, however, the downstream electronic unit 100 may be integrated with the machine controller.

Figure 2:
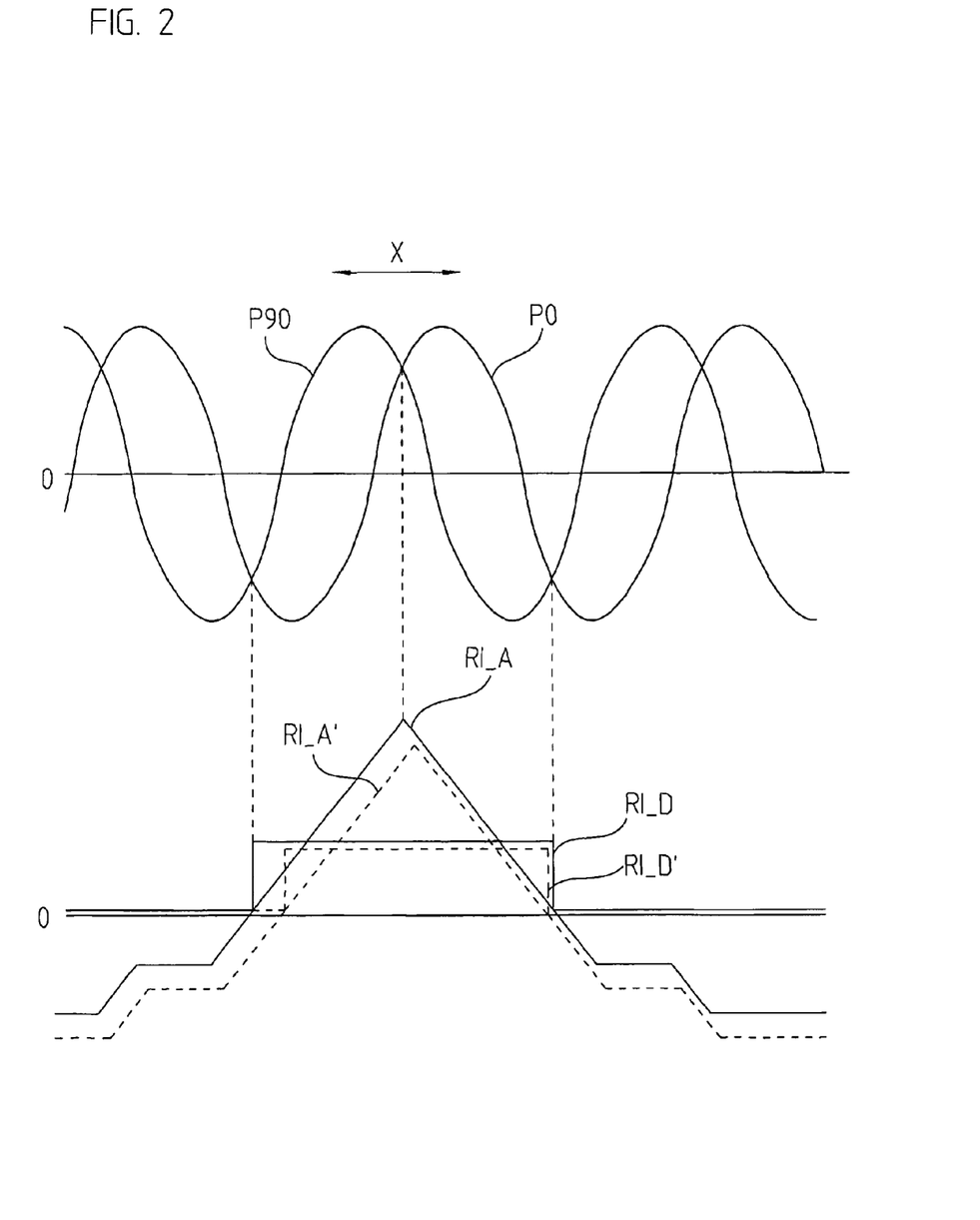
FIG. 2 shows possible signal graphs of position signals and reference impulses for the length measuring instrument of FIG. 1.

FIG. 2 shows the following: 1) position signals P0 and P90 resulting from scanning the incremental track 20, 2) the analog reference impulse RI_A resulting from scanning a reference mark 32 disposed on the reference track 30, and 3) a digital reference impulse RI_D, which is generated in a known manner by the comparison of the analog reference impulse RI_A with a defined switching threshold by a comparator. When the scanning unit 40 travels relative to the incremental track 20 in a measurement direction X at a constant speed, the position signals P0, P90 are largely sinusoidal. Furthermore, the distance traveled between two division marks is resolved as one complete period of the sinusoidal oscillation, corresponding to 360°. The position signals P0, P90 also have a phase offset of 90° from one another. This provides several advantages, on the one hand, further evaluation of the position information in the downstream electronic unit is possible and; on the other hand, the phase relationship of the position signals P0, P90 varies depending on the direction of motion of the scanning unit 40, and as a result, simple determination of the direction of motion becomes possible.

From the signals shown in FIG. 2, the problems addressed at the outset in the generation of a reference impulse RI are meant to be further clarified. For the considerations that follow, it should be assumed that the downstream electronic unit 100 requires a reference impulse RI that has a width of 360°, corresponding to one division period of the sinusoidal position signals P0, P90, and the reference impulse RI's location is adjusted to be symmetrical to the 135° position of the position signal P90. This requirement is difficult to meet in practice, since the location and width of the reference impulse RI, as noted at the outset, is determined by many factors. The mechanical disposition of the scanning unit 40 relative to the scale 10, or to the tracks 20, 30 to be scanned, is especially critical. For instance, a rotation, represented by the arrow B, of the scanning unit 40 parallel to the scale plane in the direction of the arrow A and/or a longitudinal or transverse tilting of the scanning unit 40 can cause not only a shift in the analog reference impulse RI_A in the measurement direction X relative to the position signals P0, P90 but also a deformation of the shape of the analog reference impulse RI_A. A change in the scanning spacing caused by shifting the scanning unit 40 in the direction of the arrow C, finally, causes a change in the signal intensity, which largely affects the signal amplitude of the analog reference impulse RI_A. Thermal expansion effects as well as contamination of the reference track 30 are not shown but are relevant particularly in high-resolution position measuring devices. A miscalibrated analog reference impulse RI_A', and a digital reference impulse RI_D' resulting from it, are represented in dashed lines in FIG. 2.

As described at the outset, adjusting the digital reference impulse RI_D by mechanical calibration of the scanning unit 40 in conjunction with the change in the width by varying the comparator switching thresholds (in FIG. 2, the zero line was used as the switching threshold) or by superposition of an offset is at least complicated and expensive in high-resolution position measuring devices, or even impossible to perform at all. If the digital reference impulse RI_D were transmitted as a reference impulse RI to the downstream electronic unit 100, especially if the actual location of the digital reference impulse RI_D relative to the position signals P0, P90 differs from the required location, then the effect of an overly narrow digital reference impulse RI_D in the downstream electronic unit 100 could be that the reference impulse RI goes undetected. Conversely, if the digital reference impulse RI_D is too wide, there would be the danger that the reference impulse RI would be detected twice.

Figure 3:
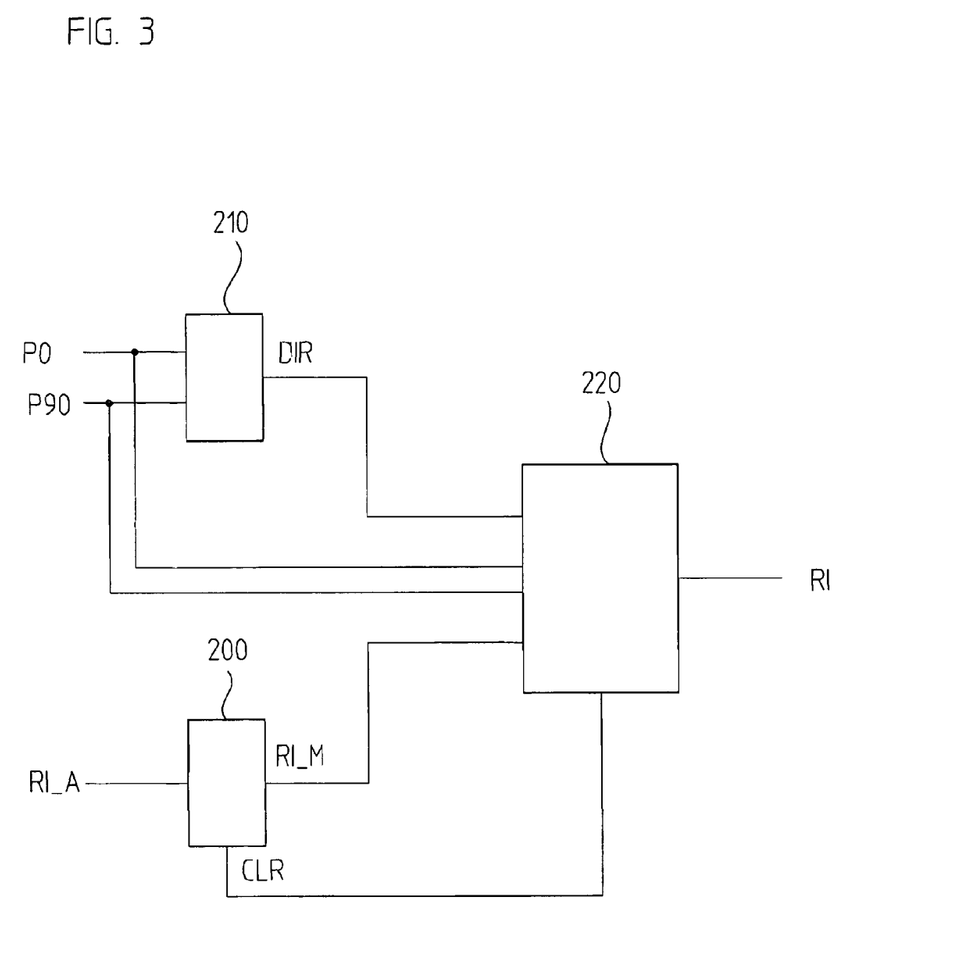
FIG. 3 is a block diagram of an embodiment of an arrangement to be used with the length measuring instrument of FIG. 1 according to the present invention.

FIG. 3 now shows an arrangement of the present invention for generating a reference impulse RI. The arrangement is such that even if an analog reference impulse RI_A is inaccurately adjusted in terms of location and width, the arrangement always generates precisely one reference impulse RI of a defined location and width relative to the position signals P0, P90. This is true even if the location of the analog reference impulse RI_A changes due to thermal or other effects during operation in a target application. The details of the arrangement in terms of circuitry will be described in further detail in conjunction with FIGS. 4 through 8.

The input signals of the arrangement are formed by the largely sinusoidal position signals P0, P90, phase-offset by 90° from one another, already shown in FIG. 2, as well as by the analog reference impulse RI_A, which results from scanning the reference mark 32 of the reference track 30.

The analog reference impulse RI_A is delivered to a reference impulse memory unit 200. This unit is designed such that it stores a single occurrence of the analog reference impulse RI_A and outputs it as a stored reference impulse RI_M. A positive signal edge, which exceeds a defined threshold value, can for instance serve as a criterion for storing the analog reference impulse RI_A. Since the analog reference impulse RI_A occurs independently of the direction of motion of the scanning pass over the reference mark 32, the analog reference impulse RI_A is likewise stored independently of the direction of motion. Via a reset signal CLR, the stored reference impulse RI_M can be erased again.

Figure 4:
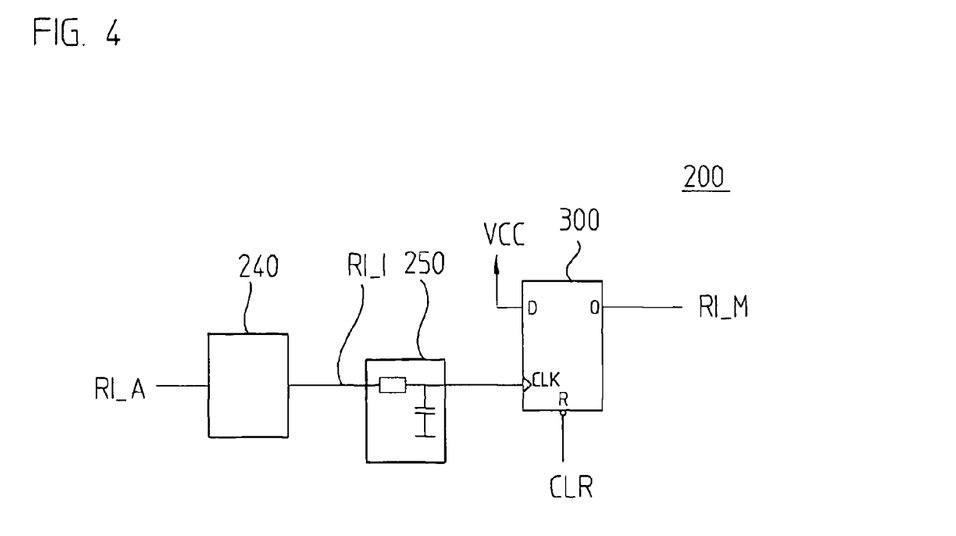
FIG. 4 shows an embodiment of a reference impulse memory unit to be used with the arrangement of FIG. 3 in accordance with the present invention.

As shown in FIG. 4, the reference impulse memory unit 200 can be embodied to include a first D flip-flop 300 whose data input D is fixedly connected to the positive supply voltage VCC corresponding to a logical high level, and to which an internal reference impulse RI_I is delivered that results from the analog reference impulse RI_A, being can be used. At a positive edge of the internal reference impulse RI_I, the logical high level is stored in memory at the data input D and appears at the output Q as a stored reference impulse RI_M. The first D flip-flop 300 furthermore has a reset input R, by way of which the output Q can be reset to a logical low level by the reset signal CLR, which is preferably low-active.

The internal reference impulse RI_I can either directly be the analog reference impulse RI_A, or the analog reference impulse RI_A processed in a reference impulse processing unit 240. Whether and in what form the analog reference impulse RI_A must be processed depends essentially on the form in which it is presented, or what demands the clock input CLK of the first D flip-flop 300 makes of the internal reference impulse RI_I. Thus, in position measuring devices that employ an optical scanning principle, the analog reference impulse RI_A is often a current pulse, while the first D flip-flop 300, if it is embodied using conventional technology, expects a voltage pulse. In that case, the current pulse must be converted to a voltage pulse of defined amplitude, for instance by a current-to-voltage converter. Scanning principles are also known in which the analog reference impulse RI_A resulting from scanning the reference mark 32 includes a plurality of individual signals, which are linked in the reference impulse processing unit 240 to form an internal reference impulse RI_I. The internal reference impulse RI_I can be either an analog or a digital signal.

To avoid storage by mistake resulting from interfering pulses that are superimposed on the internal reference impulse RI_I, or from multiple switching actions, especially at the turn-off edge of the internal reference impulse RI_I, a filter unit 250 is advantageously disposed upstream of the clock input CLK of the first D flip-flop 300. This filter unit 250 can in the simplest case include an RC low-pass filter, which damps interfering pulses above a limit frequency without significantly impairing the signal shape of the internal reference impulse RI_I. If the internal reference impulse RI_I is a digital signal, then a digital low-pass filter can also be used as the filter unit 250, which prevents multiple switching and thus ensures that when the scanning unit 40 passes over the reference mark 32, only precisely one turn-on and one turn-off edge occurs at the clock input CLK of the first D flip-flop 300.

From the position signals P0 and P90, the direction of motion of the scanning unit 40 relative to the scale 10 or to the incremental track 20, is ascertained in a direction discriminator 210 and output as a directional signal DIR. The direction of motion can be ascertained for instance by evaluating the phase relationship of the position signals P0, P90. If the second position signal P90 leads ahead of the first position signal P0 in a first direction of motion, then in a second, opposite direction of motion, it trails it.

Figure 5:
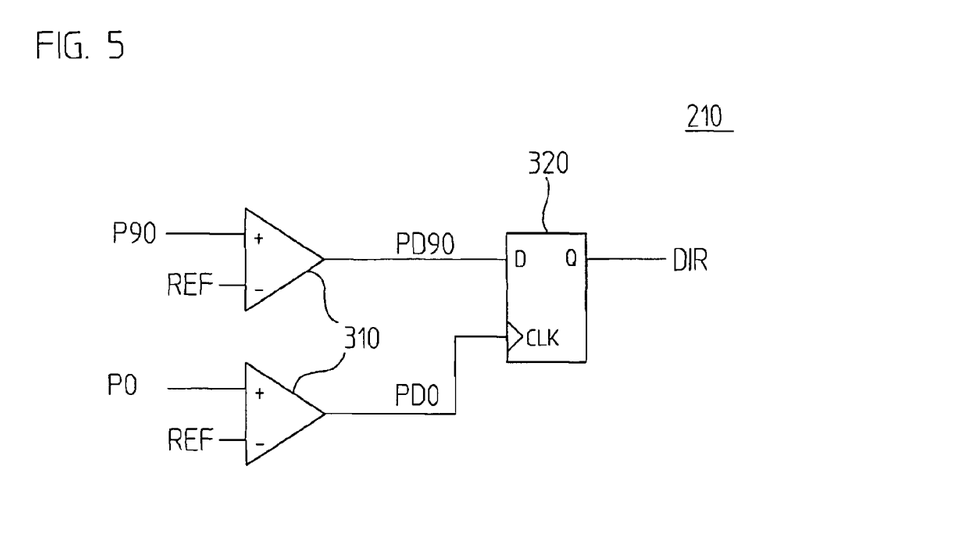
FIG. 5 shows an embodiment of a direction discriminator to be used with the arrangement of FIG. 3 in accordance with the present invention.

As FIG. 5 shows, the direction discriminator 210 is advantageously embodied so that signals PD0, PD90 are generated. The digital position signals are generated from the sinusoidal position signals P0, P90, by comparators 310, by comparison of the signal levels with a reference voltage (if the sinusoidal signals are disposed symmetrically relative to the zero line, the reference point of the circuit can be used as the reference voltage). The phase relationship of position signals PD0, PD90 contains the information about the direction of motion. Advantageously, the comparators 310 are wired in such a way that they have a hysteresis function. In the example shown, for determining the directional signal DIR from the phase relationship of the digital position signals PD0, PD90, the second digital position signal PD90 is delivered to the data input D, and the first digital position signal PD0 is delivered to the clock input CLK of a second D flip-flop 320. In this way, the level of the second digital position signal PD90 is stored at every leading signal edge of the first digital position signal PD0 and output at the output Q as a directional signal DIR.

Figure 6:
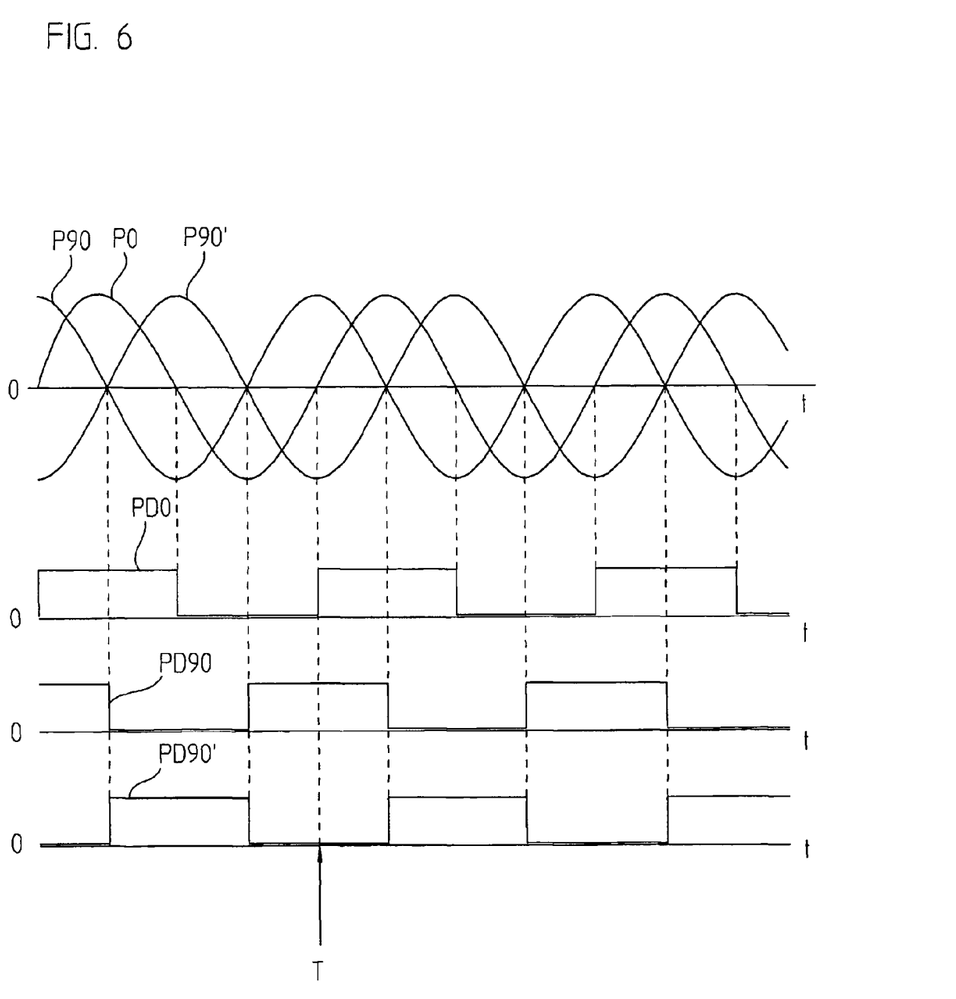
FIG. 6 shows a signal graph to explain the function of the direction discriminator of FIG. 5.

This will be illustrated further in conjunction with FIG. 6. The upper graph shows the analog position signals P0 and P90. The second analog position signal P90 appears, in the reverse direction of motion, as a reverse analog position signal P90'. Below that, the corresponding digital position signals PD0, PD90, PD90' are shown. As can be seen from the example of the rising signal edge of the first digital position signal PD0 at time T, the digital second position signals PD90 and PD90' each have different digital levels depending on the direction of motion.

As shown in FIG. 3, the stored reference impulse RI_M, the directional signal DIR, and the position signals P0, P90 are delivered to a reference impulse generating unit 220, which generates the reference impulse RI of the present invention. The reference impulse generating unit 220 turns the reference impulse RI on as a function of the arrival of the stored reference impulse RI_M and the occurrence of a set condition and turns it off again upon the occurrence of a reset condition. The set and reset conditions are derived from at least one of the position signals P0, P90, but advantageously from both position signals P0, P90 phase-offset from one another by 90°.

For transmitting the reset signal CLR to reference impulse memory unit 200 per FIG. 2, the reference impulse generating unit 220 communicates via a signal line with the reset input R of the reference impulse memory unit 200 and resets the stored reference impulse RI_M 1) before the next occurrence of an analog reference impulse RI_A, and 2) advantageously already immediately after the turning on of the reference impulse RI. To prevent repeated triggering, that is, an erroneous re-storing of the analog reference impulse RI_A in the first D flip-flop 320, it is advantageous if the reset signal CLR is maintained at least until the scanning pass over the reference mark 32 has been completed.

To generate a reference impulse RI that corresponds to the digital reference impulse RI_D of FIG. 2—width 360° and location symmetrical to the 135° position of the second position signal P90—the transition P90<P0 to P90>P0 can be used as a set condition in the direction of motion shown. Because of the required width of the reference impulse RI of 360°, corresponding to one division period, the next occurrence of the same transition after the occurrence of the set condition is obtained as the reset condition.

Advantageously, the set and reset conditions are defined as a function of direction. In the direction of motion shown in FIG. 6, the second position signal P90 leads the first position signal P0 by 90°. In the opposite direction, the second position signal P90 trails the first position signal P0 by 90°, which means that the set condition changes at the transition from P0<P90 to P0>P90 (the phrase "P0<P90 to P0>P90" means the point in time when the signal level of signal P0 compared to the signal level of signal P90 changes from P0 smaller than P90 to P0 greater than P90). For the reset condition, the second occurrence of this transition now applies. The reference impulse RI that now occurs also has a width of 360°, but because of the transposition of the order of the two position signals P0, P90, it is now symmetrical to the 135° position of the first position signal P0. For the selection of the set and reset conditions as a function of the direction of motion, the directional signal DIR is used.

Figure 7:
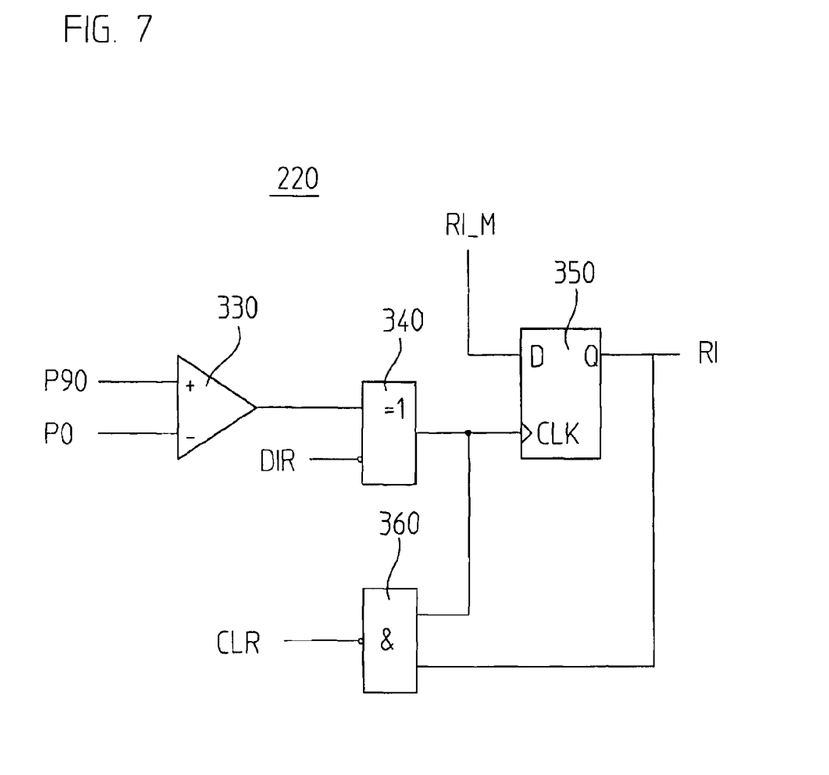
FIG. 7 shows an embodiment of a reference impulse generating unit to be used with the arrangement of FIG. 3 in accordance with the present invention.

A variant circuit for the reference impulse generating unit 220 for the generation of the reference impulse RI as a function of the direction of motion is shown in FIG. 7. For ascertaining the set condition or reset condition, the transitions P0<P90 and P0>P90, respectively, are ascertained by a third comparator 330 by comparison of the signal levels of the analog position signals P0, P90. The edges of the output signal of the third comparator 330 define the transitions P0<P90 to P0>P90 and P90<P0 to P90>P0, respectively. To avoid multiple switching of the third comparator 330, it is also especially advantageous here if the comparator 330 has a hysteresis function. The output signal of the third comparator 330 is delivered to an exclusive OR gate 340. The second input of the exclusive OR gate 340 is connected to the directional signal DIR, which in this example is used inverted. In this way, at the output of the exclusive OR gate 340, positive signal edges occur as a function of the direction of motion upon the occurrence of the set condition or reset condition, and these edges are delivered to the clock input CLK of a third D flip-flop 350. At the output Q of the third D flip-flop 350, the logical signal level of the stored reference impulse RI_M, present at the data input D, now appears upon each positive signal edge at the clock input CLK. The signal at the output Q thus corresponds to the reference impulse RI. Since this reference impulse is allowed to be output upon each occurrence of the internal reference impulse RI_I only for the requisite 360°, the reset signal CLR is generated by logical NAND linking of the output Q to the output of the exclusive OR gate 340. The stored reference impulse RI_M is thus erased again immediately after the turning on of the reference impulse RI. As required by the reference impulse memory unit 200 shown in FIG. 4, the reset signal CLR is low-active; this means that the reset of the reference impulse memory unit 200 takes place at a transition of the reset signal CLR from a high level to a low level.

Figure 8:
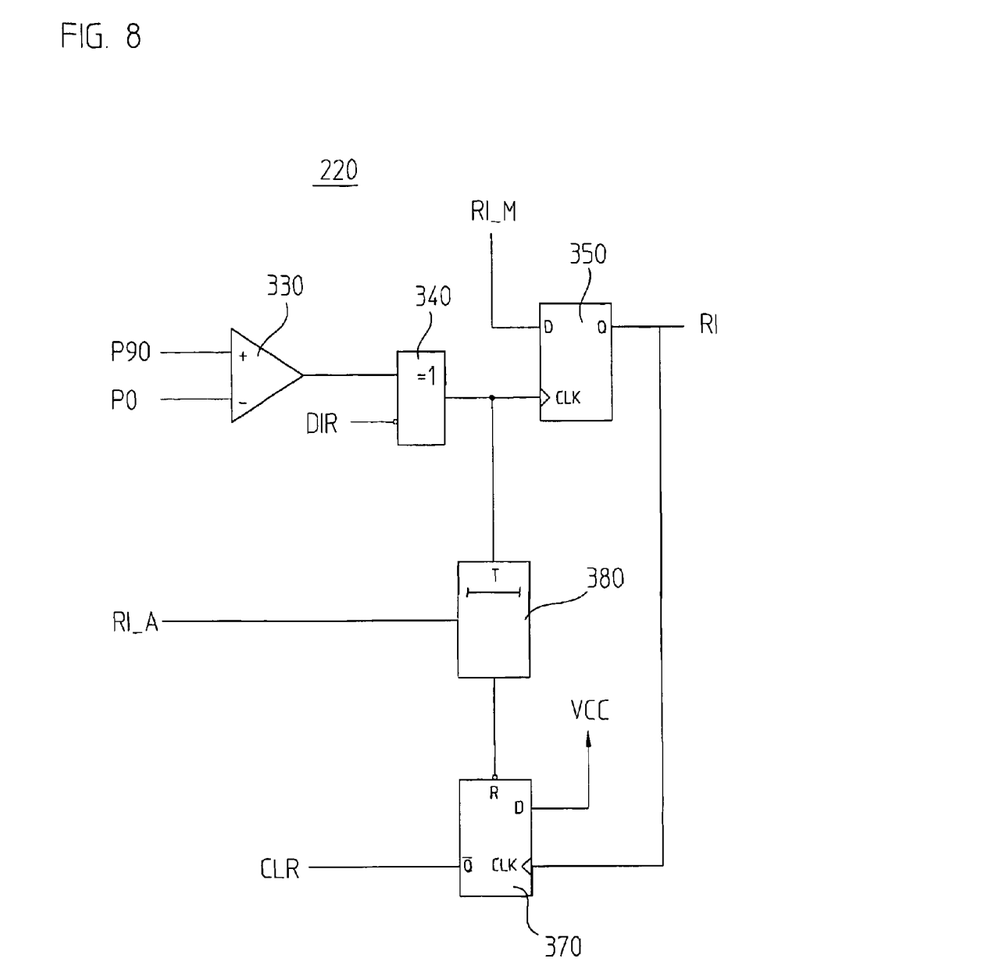
FIG. 8 shows a second embodiment of a circuit of a reference impulse generating unit to be used with the arrangement of FIG. 3 in accordance with the present invention.

FIG. 8 shows an alternative embodiment of the circuit variant shown in FIG. 7, In this embodiment, the reset signal CLR is kept active beyond the duration of the internal reference impulse RI_I. This is necessary whenever it cannot be ensured that only precisely one edge occurs at the clock input CLK of the first D flip-flop 300 at the end of the internal reference impulse RI_I. It is especially critical when the scanning unit 40 is passing very slowly over the reference mark 32, since the slow signal edge then occurring of the analog reference impulse RI_A can cause multiple switching of the internal reference impulse RI_I in the further processing in the reference impulse processing unit 240, for instance upon conversion into a digital signal by a comparator.

In the alternative embodiment of FIG. 8, a fourth D flip-flop 370 is used for activating the reset signal CLR; its inverting output Q is set to the logical low level by the outputting of the reference impulse RI. The deactivation of the reset signal CLR is now done in delayed fashion by a delay member 380. As a reference signal for the onset of the delay, it is possible, as shown in FIG. 8, to use the analog reference impulse RI_A, or its turn-on or turn-off edge. The internal reference impulse RI_I, the stored reference impulse RI_M, and the reference impulse RI are equally well suited.

Shift register or counter circuits, for instance, are suitable for realizing the delay member 380; as a shift or counting contact, the signal derived from the directional signal DIR and the position signals P0, P90 can be used at the output of the exclusive OR gate 340. Advantageously, the delay member 380 is embodied such that the reset signal CLR is active until at least one division period that has elapsed after the reference mark 32 has been fully scanned.

At this point, it should be expressly noted that the direction discriminator 210 can be dispensed with, if the set and reset conditions are referred to only one of the position signals P0, P90, such as a set condition at the first positive zero crossover, and the reset condition at the next positive zero crossover of the second position signal P90, after the occurrence of the stored reference impulse RI_M. It is equally true that a direction discriminator 210 is not necessary, if the downstream electronic unit 100 is capable of processing two different locations of the reference impulse RI. Thus under the aforementioned set/reset conditions—first and second transitions of P90<P0 to P90>P0—in the opposite direction of motion a reference impulse RI occurs, which likewise has a width of 360° but is disposed symmetrically around the 225° position.

In summary, the basis of the arrangement of the present invention is the following method:
1. Storing the analog reference impulse RI_A in the reference impulse memory unit 200 and outputting the stored reference impulse RI_M to the reference impulse generating unit 220.
2. Turning on the reference impulse RI in the reference impulse generating unit 220 as a function of the stored reference impulse RI_M and of the occurrence of a set condition.
3. Turning off the reference impulse RI in the reference impulse generating unit 220 after the occurrence of a reset condition.

The set and reset conditions can each be derived from at least one position signal P0, P90, but advantageously from a combination of both position signals P0, P90.

Before the next scanning pass over the reference mark 32, the reference impulse memory unit 200 is reset again by a reset signal CLR. Advantageously, the generation of the reset signal CLR takes place in the reference impulse generating unit 220, between the second and third method steps.

It is also especially advantageous, particularly in view of conventionally equipped downstream electronic units that are on the market, if the set and reset conditions are adapted as a function of the direction of motion, using a directional signal DIR that is generated in a direction discriminator 210.

The digital components of the present invention are especially well suited for being integrated with programmable digital components, such as CPLDs (complex programmable logic devices) or FPGAs (field programmable gate arrays). Because only little space is required as a result, it is advantageous to dispose the arrangement of the invention directly in the scanning unit 40 of the position measuring device.

Further embodiment variations of the method and devices in accordance with the present invention of course exist besides the explained examples and embodiments.

I claim:

1. An arrangement for generating a reference impulse for a position measuring device, wherein said position measuring device comprises: a scale with at least one incremental track and at least one reference mark and a scanning unit for generating position signals by scanning said at least one incremental track and for generating an analog reference impulse by scanning said at least one reference mark, said arrangement comprising:
   a reference impulse memory unit that receives said analog reference impulse and stores said received analog reference impulse as a stored reference impulse;
   a reference impulse generating unit in communication with said reference impulse memory unit, wherein said reference impulse generating unit receives said stored reference impulse and at least one of said position signals and turns on a reference impulse as a function of said stored reference impulse and an occurrence of a set condition and turns off said reference impulse if a reset condition occurs, and said set and reset conditions are derivable from said at least one of said position signals.

2. The arrangement as defined by claim 1, further comprising a direction discriminator that is in communication with said reference impulse generating unit, wherein at least two of said plurality of position signals, which have a phase offset from one another, are delivered to said direction discriminator, with which, by ascertaining a phase relationship of said at least two of said plurality of position signals, a directional signal which indicates a direction of motion is generated and delivered to said reference impulse generating unit, and said set condition and said reset condition are selectable in said reference impulse generating unit as a function of said directional signal.

3. The arrangement as defined by claim 2, wherein said direction discriminator comprises two comparators with which digital position signals are generated from said at least two of said plurality of position signals, and said directional signal is generated by determining a digital level of a second digital position signal at an instant of a signal edge of a first digital position signal.

4. The arrangement as defined by claim 1, wherein said set condition in a first direction of motion is a transition from P90<P0 to P90>P0 and said set condition in a second direction of motion is a transition from P0<P90 to P0>P90, and wherein said reset conditions in said first direction and said second direction is an occurrence, following an occurrence of said set condition, of an identical transition as said set condition, and in said reference impulse generating unit instances of an occurrence of said condition and said reset condition are ascertainable by comparison of signal levels of said position signals in a third comparator.

5. The arrangement as defined by claim 1, wherein digital components of said arrangement are integrated with a CPLD or FPGA.

6. A method for generating a reference impulse for a position measuring device, wherein said position measuring device comprises a scale with at least one incremental track and at least one reference mark and the position measuring device also includes a scanning unit for generating position signals by scanning said at least one incremental track and for generating an analog reference impulse by scanning said at least one reference mark, said method comprising:
   storing said analog reference impulse in a reference impulse memory unit as a stored reference impulse;

outputting said stored reference impulse to a reference impulse generating unit;
turning on a reference impulse in a reference impulse generating unit as a function of said stored reference impulse and of an occurrence of a set condition, which is derivable from at least one of said position signals; and
turning off said reference impulse in said reference impulse generating unit after an occurrence of a reset condition, which is derivable from said at least one of said position signals.

7. The method as defined by claim 6, wherein said set condition and said reset condition are defined as a function of a direction of motion on a basis of a directional signal, which is generated in a direction discriminator.

8. The method as defined by claim 7, further comprising generating digital position signals from said position signals, and said directional signal is generated by determining a digital level of a second digital position signal at an instant of a signal edge of a first digital position signal.

9. The method as defined by claim 6, wherein said set condition in a first direction of motion is a transition from P90<P0 to P90>P0 and said set condition in a second direction of motion is a transition from P0<P90 to P0>P90, and wherein said reset condition regarding said set condition in said first direction and said reset condition in said second direction is a next occurrence, following an occurrence of said set condition, of an identical transition as said set condition, and in said reference impulse generating unit, instances of an occurrence of said set/reset conditions are ascertained by comparison of signal levels of said position signals in a comparator.

10. The method as defined by claim 6, wherein after said reference impulse is switched on, said reference impulse generating unit generates a reset signal for erasing said stored reference impulse in said reference impulse memory unit.

11. A position measuring device, comprising:
a scale graduation comprising at least one incremental track and at least one reference mark;
a scanning unit for generating position signals by scanning said at least one incremental track and for generating an analog reference impulse by scanning said at least one reference mark; and
an arrangement for generating a reference impulse, said arrangement comprising:
a reference impulse memory unit that receives said analog reference impulse and stores said received analog reference impulse as a stored reference impulse;
a reference impulse generating unit in communication with said reference impulse memory unit, wherein said reference impulse generating unit receives said stored reference impulse and at least one of said position signals and turns on a reference impulse as a function of said stored reference impulse and an occurrence of a set condition and turns off said reference impulse if a reset condition occurs, and said set and reset conditions are derivable from said at least one of said position signals.

12. The position measuring device as defined by claim 11, wherein said arrangement further comprises a direction discriminator that is in communication with said reference impulse generating unit, wherein at least two of said plurality of position signals, which have a phase offset from one another, are delivered to said direction discriminator, with which, by ascertaining a phase relationship of said at least two of said plurality of position signals, a directional signal which indicates a direction of motion is generated and delivered to said reference impulse generating unit, and said set condition and said reset condition are selectable in said reference impulse generating unit as a function of said directional signal.

13. The position measuring device as defined by claim 12, wherein said direction discriminator comprises two comparators with which digital position signals are generated from said at least two of said plurality of position signals, and said directional signal is generated by determining a digital level of a second digital position signal at an instant of a signal edge of a first digital position signal.

14. The position measuring device as defined by claim 11, wherein said set condition in a first direction of motion is a transition from P90<P0 to P90>P0 and said set condition in a second direction of motion is a transition from P0<P90 to P0>P90, and wherein said reset conditions in said first direction and said second direction is an occurrence, following an occurrence of said set condition, of an identical transition as said set condition, and in said reference impulse generating unit instances of an occurrence of said condition and said reset condition are ascertainable by comparison of signal levels of said position signals in a third comparator.

15. The position measuring device as defined by claim 11, wherein digital components of said arrangement are integrated with a CPLD or FPGA.

\* \* \* \* \*